(12) United States Patent
Gill

(10) Patent No.: US 7,405,908 B2
(45) Date of Patent: Jul. 29, 2008

(54) MAGNETIC HEAD WITH IMPROVED FREE MAGNETIC LAYER BIASING FOR THINNER CPP SENSOR STACK

(75) Inventor: Hardayal Singh Gill, Palo Alto, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 343 days.

(21) Appl. No.: 10/909,123

(22) Filed: Jul. 30, 2004

(65) Prior Publication Data

US 2006/0023373 A1    Feb. 2, 2006

(51) Int. Cl.
    *G11B 5/127* (2006.01)
(52) U.S. Cl. .............. 360/324.12; 324/252; 338/32 R
(58) Field of Classification Search ...... 360/324–324.2, 360/324.1, 324.11, 324.12, 327.3, 327.32; 324/207.21, 252; 338/32 R
    See application file for complete search history.

(56) References Cited

U.S. PATENT DOCUMENTS

| | | | | |
|---|---|---|---|---|
| 5,583,725 | A * | 12/1996 | Coffey et al. | 360/324.11 |
| 6,074,767 | A * | 6/2000 | Lin | 428/811.2 |
| 6,185,078 | B1 * | 2/2001 | Lin et al. | 360/324.12 |
| 6,249,405 | B1 * | 6/2001 | Hoshiya et al. | 360/324.1 |
| 6,522,508 | B1 * | 2/2003 | Gill | 360/324.12 |
| 6,594,121 | B1 * | 7/2003 | Saito | 360/314 |
| 6,606,782 | B2 * | 8/2003 | Min et al. | 29/603.15 |
| 6,614,629 | B1 * | 9/2003 | Kakihara | 360/324.1 |
| 6,700,760 | B1 | 3/2004 | Mao | 360/324.2 |
| 6,710,987 | B2 * | 3/2004 | Sun et al. | 360/324.2 |
| 6,740,987 | B2 * | 5/2004 | Kitajima et al. | 290/40 C |
| 6,754,056 | B2 * | 6/2004 | Ho et al. | 360/324.2 |
| 7,008,703 | B2 * | 3/2006 | Hasegawa et al. | 428/811.5 |
| 2001/0012188 | A1 * | 8/2001 | Hasegawa et al. | 360/324.12 |

(Continued)

OTHER PUBLICATIONS

Magnetics, IEEE Transactions on Jan. 2002, vol. 38, issue 1; "Spin-valve heads with self-stabilized free layer by antiferromagnet".
Magnetics Conference, 2002, Digest of Technical Papers, Apr. 28, 2002, "Tunnel-valve and spin-valve structures with in situ in-stack bias".

*Primary Examiner*—Brian E. Miller
*Assistant Examiner*—Matthew G. Kayrish
(74) *Attorney, Agent, or Firm*—Robert O. Guillot; Intellectual Property Law Offices

(57) ABSTRACT

In a CPP magnetic head a free magnetic layer and a magnetic biasing layer are disposed within a central layer stack. To pin the magnetization of the bias layer, an antiferromagnetic (AFM) layer is fabricated on the sides of the central stack. The AFM layer may be comprised of an electrically non-conductive AFM material such as NiO, or, where the AFM material is electrically conductive, such as PtMn or IrMn, a layer of electrical insulation is deposited to prevent the sense current from flowing through the outwardly disposed AFM layer. Portions of the bias layer are deposited upon the outwardly disposed AFM layer, such that the magnetization of the outwardly disposed portions of the bias layer are pinned by the AFM layer, which creates an effective pinning of the central portions of the bias layer. This then provides an effective biasing of the magnetization of the free magnetic layer.

22 Claims, 3 Drawing Sheets

U.S. PATENT DOCUMENTS

| | | | |
|---|---|---|---|
| 2002/0067581 A1 | 6/2002 | Hiramoto et al. | 360/322 |
| 2002/0163767 A1* | 11/2002 | Terunuma | 360/324.12 |
| 2003/0011459 A1 | 1/2003 | Hasegawa et al. | 336/200 |
| 2003/0011463 A1 | 1/2003 | Iwasaki et al. | 338/32 |
| 2003/0156362 A1 | 8/2003 | Gill | 360/324.12 |
| 2005/0219773 A1* | 10/2005 | Li et al. | 360/324.12 |

* cited by examiner

MAGNETIC HEAD WITH IMPROVED FREE MAGNETIC LAYER BIASING FOR THINNER CPP SENSOR STACK

BACKGROUND OF THE INVENTION

1. Field of the Invention

The present invention relates generally to read head sensors for magnetic heads, and more particularly to an improved sensor structure in which an antiferromagnetic pinning layer is removed from the central stack of sensor layers between the magnetic shields of a CPP sensor.

2. Description of the Prior Art

A hard disk drive stores and retrieves data by positioning a magnetic read/write head over a rotating magnetic data storage disk, where the magnetic head, or heads, read from or write data to concentric data tracks defined on surface of the disks. The goal in recent years is to increase the amount of data that can be stored on each hard disk. Increasing the areal data storage density of the disks can be accomplished by reducing the size of data bits, such that the number of bits per inch (bpi) on the data tracks on the disk can be increased. However, to read data from a disk with an increased bpi, it is also necessary to develop a sufficiently thin read gap structure within the read head of the magnetic head, such that unwanted magnetic field interference from adjacent data bits is substantially eliminated.

A read head typically includes a magnetoresistive (MR) spin valve sensor structure for reading the data from the disk of the hard disk drive. As is well known to those skilled in the art, such MR sensor structures include a plurality of thin film layers disposed between two magnetic shields that define the read gap. The thin film layers have particular magnetic properties, and are sensitive to the magnetic field of the data bits on the hard disk. Thus, thinner layers disposed between the two magnetic shields will create a thinner read gap, which will allow the read head to detect the smaller data bits that a higher bpi data track contains.

The thin film layers of a typical GMR spin valve sensor will include at least one antiferromagnetic (AFM) layer, at least one pinned magnetic layer, a spacer layer, at least one free magnetic layer and a magnetic biasing layer for the free magnetic layer. The magnetic biasing layer may require a second AFM layer to pin its magnetization in a desired direction. In operation the magnetic moment of the free layer is free to rotate laterally within the layer with respect to the ABS from a quiescent or zero bias point position in response to positive and negative magnetic field signals from data bits located on the rotating magnetic disk. The biasing layer stabilizes the free magnetic layer in its zero bias point position.

There are generally two ways to provide sense current to the read head. The older way is by supplying a current that runs longitudinally in the plane of the ABS from one side of the free magnetic layer to the other side. A more recent design is to supply the sense current perpendicularly to the plane (CPP) of the central layer stack; that is, between the magnetic shields. In such CPP head designs it is a practice in the prior art to pin the magnetization of the bias layer by using a layer of antiferromagnetic (AFM) material within the central layer stack, but this method can have disadvantages that result from the thickness of the AFM material, which is typically relatively large. This thickness of AFM material may be so great that it is a significant factor in the size of the read gap of the read heads. Therefore, there is an advantage to CPP read head sensors having a pinned bias layer that do not require that the AFM layer be disposed within the central layer stack between the magnetic shields.

SUMMARY OF THE INVENTION

A magnetic head of the present invention includes a plurality of thin film layers that are disposed in a central stack between the magnetic shields. The sense current is directed between the shields in a current perpendicular to the plane (CPP) design. A free magnetic layer is disposed within the central stack and a magnetic biasing layer is also disposed within the stack to bias the magnetization of the free magnetic layer. To pin the magnetization of the bias layer, an antiferromagnetic (AFM) layer is fabricated in an outwardly disposed location on the side of the central stack. The AFM layer may be comprised of an electrically non-conductive AFM material such as NiO, or, where the AFM material is electrically conductive, such as PtMn or IrMn, a layer of electrical insulation is deposited to prevent the sense current from flowing through the outwardly disposed AFM layer. To effectively pin the magnetization of the bias layer, a portion of the bias layer is deposited upon the outwardly disposed AFM layer, such that the magnetization of the outwardly disposed portions of the bias layer are pinned by the AFM layer, which leads to an effective pinning of the magnetization of the central portions of the bias layer. This then provides an effective biasing of the magnetization of the free magnetic layer. As a result, the AFM material layer is not disposed within the central layer stack between the magnetic shields, and the shield to shield gap is reduced.

It is an advantage of the magnetic head of the present invention that it includes a magnetoresistive read head having a decreased read gap.

It is another advantage of the magnetic head of the present invention that it includes a magnetoresistive sensor having a reduced sensor thickness.

It is a further advantage of the magnetic head of the present invention that it includes a sensor in which an AFM layer that pins the magnetization of the bias layer is not disposed within the central sensor layer stack between the magnetic shields of the sensor.

It is yet another advantage of the magnetic head of the present invention that it includes a magnetoresistive sensor in which the pinning of the magnetization of the bias layer is accomplished at a reduced temperature.

It is an advantage of the hard disk drive of the present invention that it includes a magnetic head of the present invention having a magnetoresistive spin valve sensor having a reduced read gap.

It is another advantage of the hard disk drive of the present invention that it includes a magnetic head of the present invention that includes a magnetoresistive sensor having a reduced sensor thickness.

It is a further advantage of the hard disk drive of the present invention that it includes a magnetic head of the present invention that includes a sensor in which an AFM layer that pins the magnetization of the bias layer is not disposed within the central sensor layer stack between the magnetic shields of the sensor.

It is yet another advantage of the hard disk drive of the present invention that it includes a magnetic head of the present invention that it includes a magnetoresistive sensor in which the pinning of the magnetization of the bias layer is accomplished at a reduced temperature.

These and other features and advantages of the present invention will no doubt become apparent to those skilled in the art upon reading the following detailed description which makes reference to the several figures of the drawing.

IN THE DRAWINGS

The following drawings are not made to scale as an actual device, and are provided for illustration of the invention described herein.

DETAILED DESCRIPTION OF THE PREFERRED EMBODIMENTS

Figure 1:
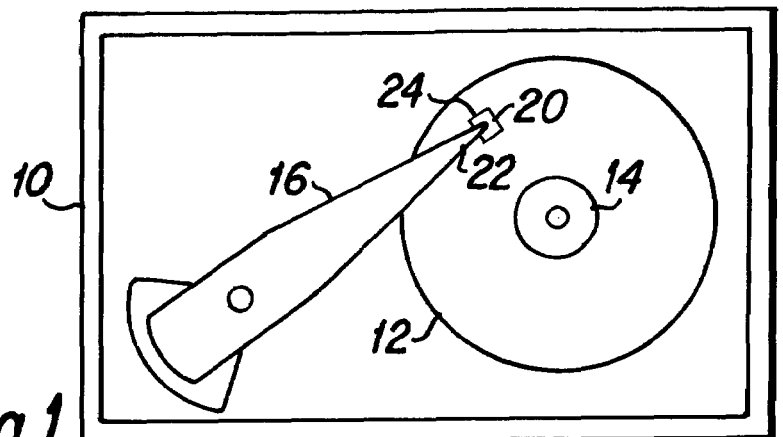
FIG. 1 is a top plan view generally depicting a hard disk drive that includes a magnetic head of the present invention.

FIG. 1 is a top plan view that depicts significant components of a hard disk drive which includes a magnetic head of the present invention. The hard disk drive 10 includes a magnetic media hard disk 12 that is rotatably mounted upon a motorized spindle 14. An actuator arm 16 is pivotally mounted within the hard disk drive 10 with a magnetic head 20 of the present invention being fabricated upon a slider 24 that is disposed upon a distal end 22 of the actuator arm 16. A typical hard disk drive 10 may include a plurality of disks 12 that are rotatably mounted upon the spindle 14 and a plurality of actuator arms 16 having a slider 24 mounted upon the distal end 22 of each of the actuator arms. As is well known to those skilled in the art, when the hard disk drive 10 is operated, the hard disk 12 rotates upon the spindle 14 and the slider 24 acts as an air bearing that is adapted for flying above the surface of the rotating disk. The slider 24 includes a substrate base upon which the various layers and structures that form the magnetic head 20 are fabricated. Such heads are fabricated in large quantities upon a wafer substrate and subsequently sliced into discrete magnetic heads 20.

Figure 2:
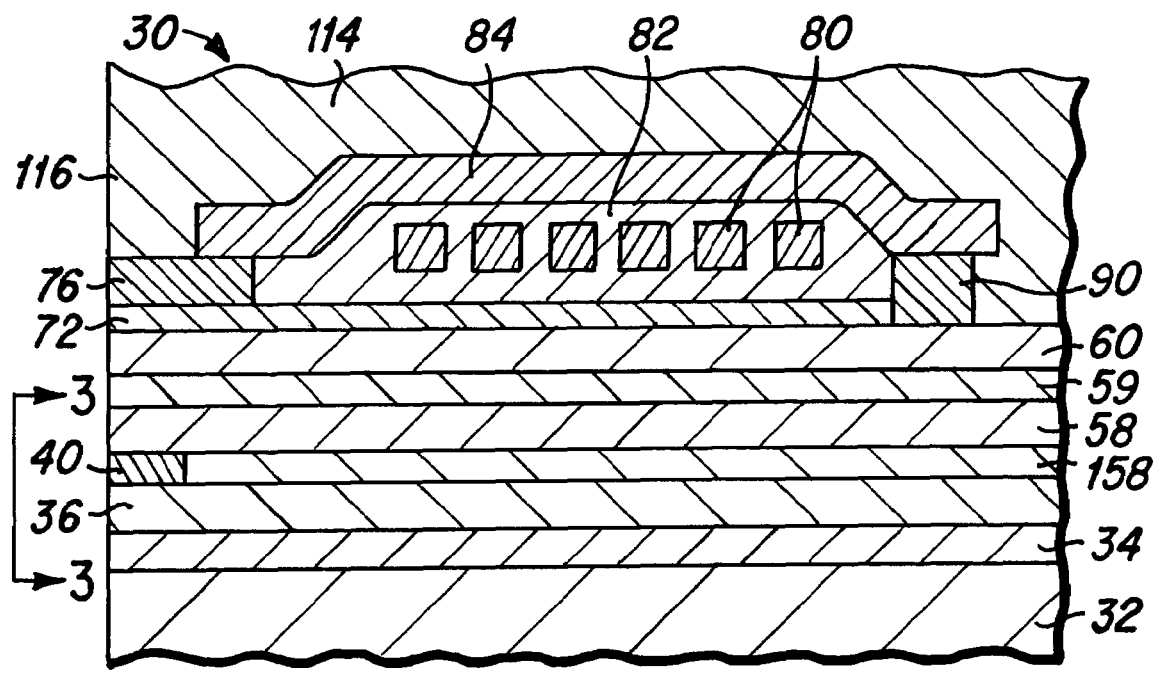
FIG. 2 is a side cross-sectional view depicting a typical prior art magnetic head.
Figure 3:
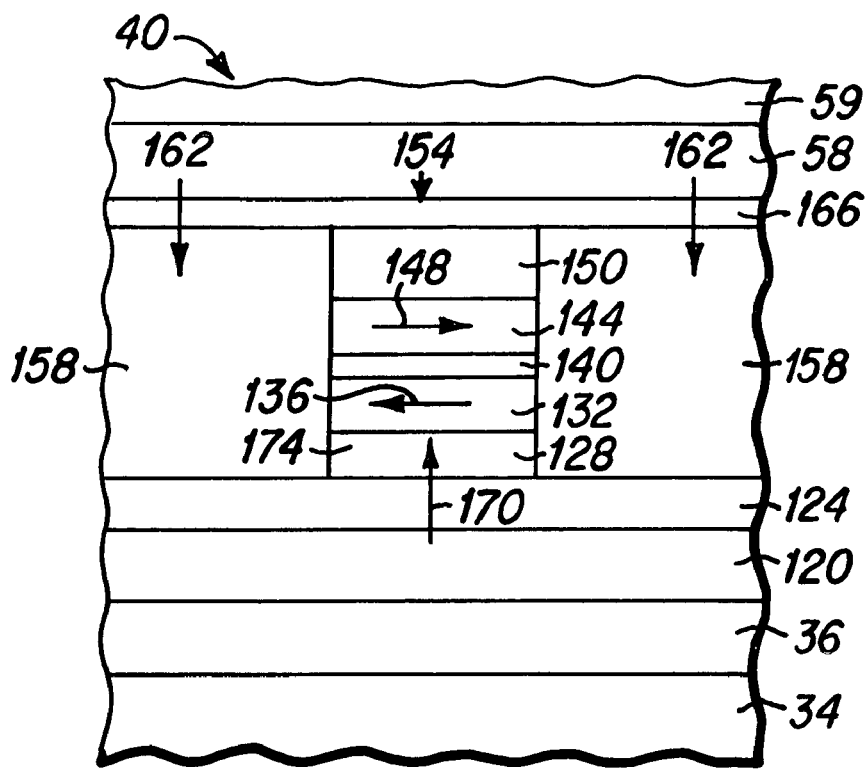
FIG. 3 is a plan view of the read head portion of the magnetic head depicted in FIG. 2, taken from the air bearing surface (ABS), and particularly along lines 3-3 of FIG. 2.

A typical prior art magnetic head structure is next described with the aid of FIGS. 2 and 3 to provide a basis for understanding the improvements of the present invention. As will be understood by those skilled in the art, FIG. 2 is a side cross-sectional view that depicts portions of a prior art magnetic head 30, and FIG. 3 is an elevational view of the read head sensor portion of the prior art magnetic head 30 depicted in FIG. 2, taken from lines 3-3 of the air bearing surface of FIG. 2.

As depicted in FIGS. 2 and 3, a typical prior art magnetic head 30 includes a substrate base 32 of the slider 24 with an insulation layer 34 formed thereon, and a first magnetic shield (S1) 36 that is fabricated upon the insulation layer. A read head sensor 40, comprising a plurality of layers of specifically chosen materials, is then fabricated upon the S1 shield 36, and a detailed description of the sensor 40 is provided hereinbelow with the aid of FIG. 3. Following the fabrication of the sensor 40 a second magnetic shield (S2) is fabricated upon the sensor 40, and an electrical insulation layer 59 is then deposited upon the S2 shield 58. A write head portion of the magnetic head 30 is next fabricated.

An embodiment of a write head portion of the prior art magnetic head 30 includes a first magnetic pole (P1) 60 that is fabricated upon the insulation layer 59. Following the fabrication of the P1 pole 60, a write gap layer 72 typically composed of a non-magnetic material such as alumina is deposited upon the P1 pole 60. This is followed by the fabrication of a P2 magnetic pole tip 76 and an induction coil structure, including coil turns 80, that is then fabricated within insulation 82 above the write gap layer 72. Thereafter, a yoke portion 84 of the second magnetic pole is fabricated in magnetic connection with the P2 pole tip 76, and through back gap element 90 to the P1 pole 60. Electrical leads (not shown) to the induction coil are subsequently fabricated and a further insulation layer 114 is deposited to encapsulate the magnetic head. The magnetic head 30 is subsequently fabricated such that an air bearing surface (ABS) 116 is created. Alternatively, other write head configurations as are known to those skilled in the art may be fabricated upon the sensor 40.

It is to be understood that there are many detailed features and fabrication steps of the magnetic head 30 that are well known to those skilled in the art, and which are not deemed necessary to describe herein in order to provide a full understanding of the present invention.

The present invention is directed towards improvements in the specific layers that comprise the sensor 40 of the read head, and a more detailed depiction of a typical prior art sensor such as may be utilized as sensor 40 in the prior art magnetic head of FIG. 2 is depicted in FIG. 3. As depicted in FIG. 3, the S1 magnetic shield 36 is fabricated upon the insulation layer 34. An antiferromagnetic (AFM) layer 120, typically comprised of a material such as PtMn, and having a thickness of approximately 150 Å, is deposited upon the S1 shield 36. Thereafter, a pinned magnetic layer 124, comprised of a material such as CoFe or NiFe is deposited upon the AFM layer 120 to a thickness of approximately 40 Å. The pinned magnetic layer 124 is fabricated with a magnetization that is directed perpendicular to the ABS plane of the magnetic head, such as into the plane of FIG. 3, and the AFM layer 120 serves to pin the magnetic field of the pinned layer 124 in that direction. Thereafter, a spacer layer 128, typically composed of an electrically conductive material such as copper and having a thickness of approximately 20-40 Å is deposited upon the pinned magnetic layer 124. A free magnetic layer 132, comprised of a material such as CoFe or NiFe, or a multi-layer combination thereof, and having a thickness of from 20 Å to 40 Å, is then fabricated upon the spacer layer 128. The free magnetic layer 132 is formed with a magnetization that is in the ABS plane of the magnetic head (see arrow 136). Thereafter, a spacer layer 140, composed of an electrically conductive material such as Ta, Ru or Cu, and having a thickness of approximately 20 Å, is deposited upon the free magnetic layer 132. A magnetic biasing layer 144, composed of a magnetic material such as CoFe, and having a thickness that is approximately equal to or somewhat greater than the thickness of the free magnetic layer 132 is fabricated upon the spacer 140. The biasing layer 144 is formed with a magnetization direction (see arrow 148) that is in the ABS plane of the magnetic head and opposite in direction to the magnetization direction (see arrow 136) of the free magnetic layer 132. The biasing layer 144 is thus exchange coupled to the free magnetic layer 132 through the spacer 140 and serves to provide a biasing magnetic field that biases the magnetization of the free magnetic layer in the desired ABS plane direction. Thereafter, a second antiferromagnetic (AFM) layer 150 is fabricated upon the bias layer 144. The second AFM layer 150 is formed of a material such as PtMn with a thickness of approximately 100 Å, and serves to pin the magnetization of the bias layer 144 in the desired direction 148.

Following the deposition of these layers, a mask (not shown) is fabricated over a central area 154 of the sensor layers and a material removal process, such as an ion milling or sputter etching process is conducted, wherein the outer (unmasked) portions of the layers are removed, down through the spacer layer, to the pinned layer 124. Thereafter, an electrically insulating material 158 such as alumina is deposited to fill the outer areas 162 where the sensor layers were removed. Thereafter, the mask is removed and a cap layer 166, typically composed of an electrically conductive material such as tantalum with a thickness of approximately 20 Å is deposited, followed by the fabrication of the second magnetic shield 58 upon the cap layer 166. The insulation layer 59 is next deposited upon the S2 shield 58 and the write head portion of the magnetic head is then fabricated, as has been described here above. In this configuration of a read head, the direction (see arrow 170) of the sense current is perpendicular to the plane (CPP) of the magnetic shield layers, and the shields 36 and 58 act as electrical leads for supplying current to the read sensor 40 which lies between them. As is seen in FIG. 2, a portion of the insulation layer 158 also separates the SI and S2 shield electrical leads in the area behind the read sensor 40, so that they do not short out along their length.

More recent prior art read heads may incorporate a tunnel barrier sensor structure which typically includes a thin, non-magnetic tunnel barrier layer sandwiched between a pinned magnetic layer and a free magnetic layer. The tunnel barrier layer is typically comprised of a non-conductive material such as alumina and is formed with a thickness of approximately 3 Å to 8 Å. With regard to the prior art sensor 40 depicted in FIG. 3, if the spacer layer 128 between the pinned layer 124 and the free layer 132 is replaced by a tunnel barrier layer 174, the sensor would thereby be converted to a tunnel barrier sensor. The tunnel barrier sensor is itself disposed between the first and second magnetic shield layers, where the first 36 and second 58 shield layers also serve as first and second electrical leads for conducting the sensor current through it, such that the tunnel barrier sensor is a CPP device.

Figure 4:
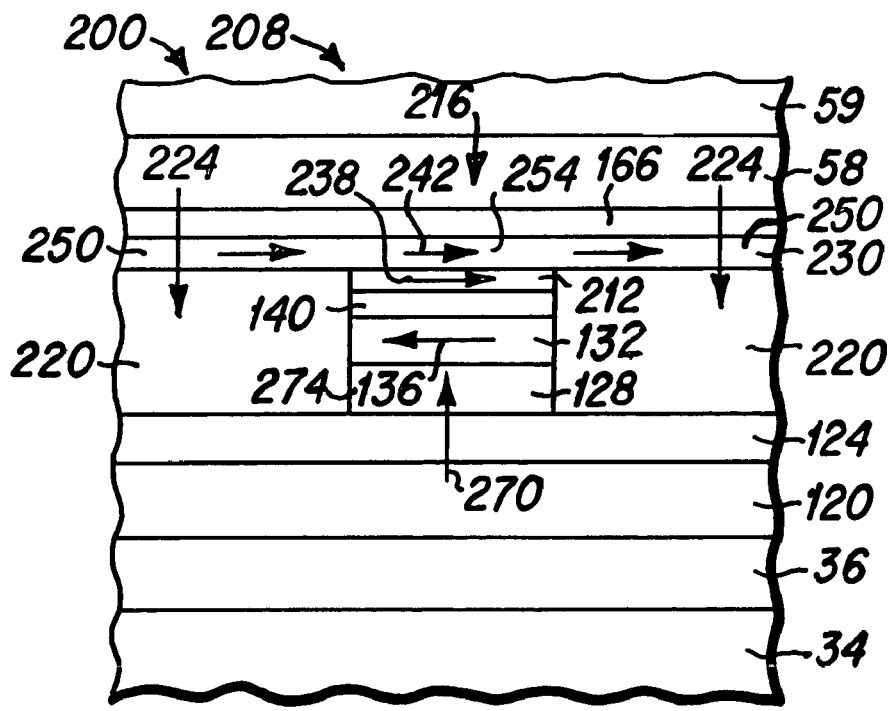
FIG. 4 is an ABS view depicting a first embodiment of a sensor structure of the present invention.

FIG. 4 is an ABS view depicting a sensor structure 200 of a magnetic head 208 of the present invention which may serve as a magnetic head 20 in FIG. 1. The sensor 200 includes several structural features that are substantially identical to those depicted in FIG. 3 and described here above, and such structures are identically numbered for ease of comprehension. As depicted in FIG. 4, the sensor 200 includes an S1 magnetic shield 36 that is fabricated upon the insulation layer 34. An antiferromagnetic (AFM) layer 120, typically comprised of a material such as PtMn, and having a thickness of approximately 150 Å, is deposited upon the S1 shield 36. The AFM layer 120 typically requires an NiFeCr/NiFe seed layer that is initially deposited upon the magnetic shield 36 to obtain stronger pinning properties. Thereafter, a pinned magnetic layer 124, comprised of a material such as CoFe or NiFe is deposited upon the AFM layer to a thickness of approximately 40 Å. The pinned magnetic layer 124 is fabricated with a magnetization that is directed perpendicular to the ABS, such as into the plane of FIG. 4, and the AFM layer 120 serves to pin the magnetic field of the pinned layer 124 in that direction. As is described in detail herebelow with the aid if FIG. 6, the pinned layer 122 may comprise an antiparallel pinned multi-layer structure of the type, CoFe/Ru/CoFe. Thereafter, a spacer layer 128, typically composed of an electrically conductive material such as copper and having a thickness of approximately 20-40 Å is deposited upon the pinned magnetic layer 124. A free magnetic layer 132, comprised of a material such as CoFe or NiFe, or a multi-layer combination thereof, and having a thickness of from 20 Å to 40 Å, is then fabricated upon the spacer layer 128. The free magnetic layer 132 is formed with a magnetization that is in the ABS plane of the magnetic head (see arrow 136). Thereafter, a spacer layer 140, composed of an electrically conductive material such as Ta, Ru or Cu, and having a thickness of approximately 20 Å, is deposited upon the free magnetic layer 132. These sensor structures of FIG. 4 are substantially similar to those depicted in FIG. 3.

A first magnetic biasing layer 212 is next fabricated upon the spacer layer 140. A spacer layer 140 comprised of Cu is preferred over other spacer layers because it provides superior magnetic properties, Hc, magnetostriction for the magnetic biasing layer 212. The biasing layer 212 is preferably comprised of a material such as CoFe and is fabricated with a thickness that is approximately one-half of the thickness of the free layer 132; that is, approximately 10 Å to 25 Å. A temporary cap layer (not shown) typically comprised of tantalum and having a thickness of approximately 20 Å is deposited upon the biasing layer 212 to protect it in subsequent fabrication steps. A mask (not shown) is next fabricated upon the central portion 216 of the sensor layers, such that outer portions of the sensor layers are not covered by the mask. Thereafter, a material removal step is conducted, such as an ion milling or sputter etching step, in which the unmasked outer portions of the sensor layers are removed, down to the pinned magnetic layer 124, while the masked central region 216 is protected. Thereafter, an electrically non-conducting, antiferromagnetic layer structure 220, comprised of a material such as NiO is deposited to fill the outer portions 224 of the sensor next to the masked central region. The thickness of the NiO AFM layer structure 220 should be approximately equal to the thickness of the central layer stack region 216. Following the deposition of the NiO AFM layer structure 220, the mask is removed and the temporary cap layer (not shown) mentioned above is removed, preferably utilizing a reactive ion etch (RIE) process with fluorine active species, as is known to those skilled in the art.

A second bias layer 230 is next deposited across the sensor surface. The second bias layer 230 is preferably formed from a material such as CoFe and has a thickness that is approximately one-half of the thickness of the free magnetic layer 132; that is, approximately 10 Å to 25 Å. The magnetization of the first bias layer (see arrow 238) and of the second bias layer (see arrow 242) is directed in the plane of the ABS of the magnetic head and opposite to the direction of magnetization (see arrow 136) of the free magnetic layer. The total thickness of the first 212 plus second 230 bias layers is preferably equal to or somewhat greater than (approximately 1.2 to 1.5 times) the thickness of the free magnetic layer 132, and the magnetization of the free magnetic layer 132 is magnetically exchange coupled through the spacer to the magnetization of the bias layers. A cap layer 166 and the second magnetic shield 58 are subsequently fabricated upon the second bias layer, and the insulation layer 59 is thereafter deposited upon the second magnetic shield 58 to complete the fabrication of the read head portion of the magnetic head.

The laterally disposed AFM layer structures 220 provide a strong pinning effect on the magnetization of the second bias layer 230 that is deposited above the AFM layer structures, and the strong pinning of the outer portions 250 of the second bias layer 230 serve to pin the central portion 254 of the second bias layer 230. The pinned second bias layer 230 then strongly pins the magnetization of the first bias layer 212. As a result, an effective biasing of the magnetization of the free magnetic layer 132 is achieved.

In comparing the sensor embodiment of the present invention depicted in FIG. 4, with the prior art sensor depicted in FIG. 3, a first significant difference is that the shield to shield distance has been reduced in the magnetic head embodiment 208 depicted in FIG. 4 by the removal of the second AFM layer 150 from the central stack structure 154 between the magnetic shields 36 and 58. This is accomplished in the present invention by moving the second AFM layer 220 to the locations 224 along side of the central sensor stack 216. The biasing of the free magnetic layer 132 is nevertheless achieved because the bias layer has been reshaped into a two layer structure, where the first bias layer 212 is formed above the free magnetic layer 132 while the second bias layer 230 is formed with outward portions 250 that are fabricated above the laterally disposed AFM layer structures 220 and strongly pinned by it. As a result, the shield to shield distance of the magnetic head embodiment 208 of the present depicted in FIG. 4 is reduced from that of the prior art sensor of FIG. 3, such that smaller data bits of a hard disk having an increased a real data storage density can be effectively read by the magnetic head sensor 200 of the present invention.

Another advantage of the magnetic head sensor 200 of FIG. 4 is that the sense current does not pass through the biasing portion 250 of the bias layer 230, and this results in a lowering of the temperature where the magnetic biasing occurs. Specifically, it is known that the effective pinning of the magnetization of the biasing layer is temperature sensitive, and a temperature of approximately 250° C. can effectively reduce to near zero the magnetic pinning effect between the AFM layer and the bias layers. In a CPP head such as is depicted in FIG. 3, it is not uncommon for the head to reach operating temperatures of approximately 180° C., which can substantially reduce the pinning effect between the bias layer 144 and the central AFM layer 150. However, in the present invention, the pinning of the biasing layer 230 occurs at laterally disposed locations 250 away from the central electrical current path (see arrow 270), and the temperature at the outward biasing locations 250 can be as low as 60 to 80° C., such that the pinning effect is not substantially reduced by the high temperature in the electrically conducting central stack 216.

The magnetic head sensor depicted in FIG. 4 and described here above, can be fabricated as a tunnel barrier sensor by a modification of the spacer layer that is disposed between the pinned layer and the free magnetic layer. Specifically, as described here above with regard to FIG. 3, where the spacer layer 128 is replaced a tunnel barrier layer 274, comprised of an electrically insulating material such as alumina and having a thickness of approximately 3 to 8 Å a tunnel barrier sensor of the present invention is created. As will be understood by those skilled in the art. A tunnel barrier sensor embodiment of FIG. 4 will have a somewhat reduced shield to shield distance in that the tunnel barrier layer is thinner than the spacer layer of the GMR sensor device.

Figure 5:
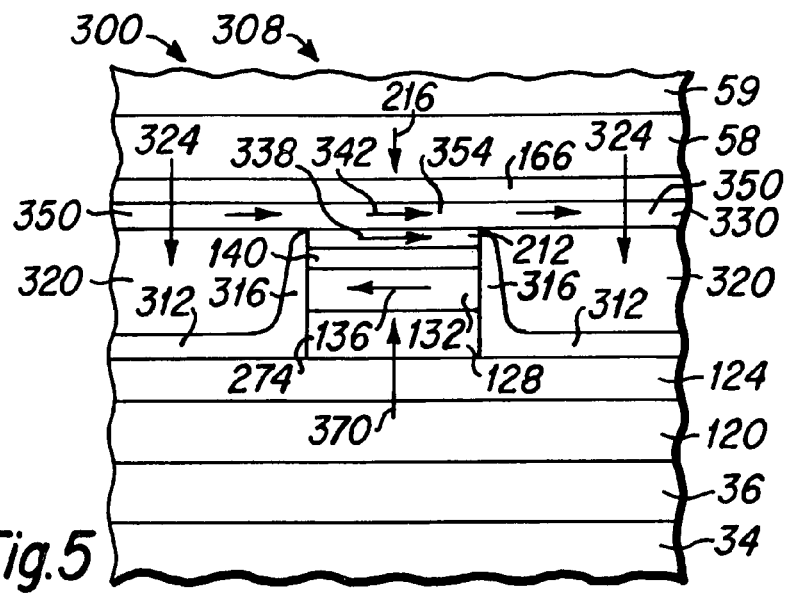
FIG. 5 is an ABS view depicting a second embodiment of a sensor structure of the present invention.

An alternative sensor embodiment 300 of a magnetic head 308 the present invention is next described with the aid of FIG. 5, which is an ABS view depicting a sensor structure 300 of the present invention. As will be understood from the following description, the significant difference between the magnetic head 308 of FIG. 5 and that 208 of FIG. 4 is the composition and structure of the laterally disposed AFM structures. Specifically, in the embodiment of FIG. 5, the AFM structures are comprised of an electrically conductive material, and an additional electrically insulating layer is utilized to prevent the sense current from being diverted through the laterally disposed AFM structures. Therefore, the sensor 300 includes many structural features that are substantially identical to those depicted in FIG. 4 and described here above, and such structures are identically numbered in FIG. 5 and in the detailed description that follows for ease of comprehension.

As depicted in FIG. 5, the sensor 300 includes an SI magnetic shield 36 that is fabricated upon the insulation layer 34. An antiferromagnetic (AFM) layer 120, typically comprised of a material such as PtMn, and having a thickness of approximately 150 Å, is deposited upon the S1 shield. The AFM layer 120 typically requires an NiFeCr/NiFe seed layer that is initially deposited upon the magnetic shield 36 to obtain stronger pinning properties. Thereafter, a pinned magnetic layer 124, comprised of a material such as CoFe or NiFe is deposited upon the AFM layer 120 to a thickness of approximately 40 Å. The pinned magnetic layer 124 is fabricated with a magnetization that is directed perpendicular to the ABS, such as into the plane of FIG. 5, and the AFM layer 120 serves to pin the magnetic field of the pinned layer 124 in that direction. As is described in detail herebelow with the aid of if FIG. 7, the pinned layer 122 may comprise an antiparallel pinned multilayer structure of the type, CoFe/Ru/CoFe. Thereafter, a spacer layer 128, typically composed of an electrically conductive material such as copper and having a thickness of approximately 20-40 Å is deposited upon the pinned magnetic layer 124. A free magnetic layer 132, comprised of a material such as CoFe or NiFe, or a multi-layer combination thereof, and having a thickness of from 20 Å to 40 Å, is then fabricated upon the spacer layer 128. The free magnetic layer is formed with a magnetization that is in the ABS plane of the magnetic head (see arrow 136). Thereafter, a spacer layer 140, composed of an electrically conductive material such as Ta, Ru or Cu, and having a thickness of approximately 20 Å, is deposited upon the free magnetic layer 132. A first magnetic biasing layer 212 is next fabricated upon the spacer layer 140. A spacer layer 140 comprised of Cu is preferred over other spacer layers because it provides superior magnetic properties, Hc, magnetostriction for the magnetic biasing layer 212. The first biasing layer 212 is preferably comprised of a material such as CoFe and is fabricated with a thickness that is approximately one-half of the thickness of the free layer 132; that is, approximately 10 Å to 25 Å. A temporary cap layer (not shown) typically comprised of tantalum and having a thickness of approximately 20 Å is deposited upon the biasing layer 212 to protect it in subsequent fabrication steps.

A mask (not shown) is next fabricated upon the central portion 216 of the sensor layers, such that outer portions of the sensor layers are not covered by the mask. Thereafter, a material removal step is conducted, such as an ion milling or sputter etching step, in which the unmasked outer portions of the sensor layers are removed, down to the pinned magnetic layer 124, while the masked central region 216 is protected. An electrically insulative layer 312 is next deposited across the device. The electrically insulative layer 312 is preferably comprised of a material such as alumina and it is deposited to a thickness of at least approximately 20 Å to provide adequate electrical insulation. It is desirable that the alumina insulation be deposited upon the side surfaces 316 of the central sensor stack 216 to prevent electrical current leakage from the central stack. Thereafter, an electrically conductive, antiferromagnetic layer structure 320, comprised of a material such as IrMn or PtMn is deposited to fill the outer portions 324 of the sensor next to the masked central region 216 and on top of the insulating layer 312. The thickness of the insulating layer 312 plus the AFM layer 320 should be approximately equal to the thickness of the central region 216. Following the deposition of the AFM layer 320, the mask is removed and the temporary cap layer (not shown) mentioned above is removed, preferably utilizing a reactive ion etch (RIE) process with fluorine active species, as is known to those skilled in the art.

A second bias layer 330 is next deposited across the sensor surface. The second bias layer 330 is preferably formed from a material such as CoFe and has a thickness that is approximately one-half of the thickness of the free magnetic layer 132; that is, approximately 10 Å to 25 Å. Where the AFM material 320 is IrMn it is particularly desirable for good pinning of the bias layers that the second bias layer 330 be comprised of $CoFe_{30}$. The magnetization of the first bias layer (see arrow 338) and of the second bias layer (see arrow 342) is directed in the plane of the ABS and opposite to the direction of magnetization (see arrow 136) of the free magnetic layer. The total thickness of the first 212 plus second 330 bias layers is preferably equal to or somewhat greater than (approximately 1.2 to 1.5 times) the thickness of the free magnetic layer 132, and the magnetization of the free magnetic layer is magnetically exchange coupled to the magnetization of the bias layers. A cap layer 166 and the second magnetic shield 58 are subsequently fabricated upon the second bias layer, and the insulation layer 59 is thereafter deposited upon the second magnetic shield 58 to complete the fabrication of the read head portion of the magnetic head.

The laterally disposed AFM layer structures 320 provide a strong pinning effect on the magnetization of the second bias layer 330 that is deposited above the AFM layer structures, and the strong pinning of the outer portions 350 of the second bias layer 330 serve to pin the central portion 354 of the second bias layer 330. The pinned second bias layer 330 then strongly pins the magnetization of the first bias layer 212. As a result, an effective biasing of the magnetization of the free magnetic layer is achieved.

In comparing the sensor embodiment of the present invention depicted in FIG. 5, with the prior art sensor depicted in FIG. 3, a first significant difference is that the shield to shield distance has been reduced in the embodiment 308 depicted in FIG. 5 by the removal of the second AFM layer 150 from the central stack structure between the magnetic shields. This is accomplished in the sensor 300 by moving the second AFM layer 320 to the locations along side of the central sensor stack. The biasing of the free magnetic layer 132 is nevertheless achieved because the bias layer has been reshaped into a two layer structure, where the first bias layer 212 is formed above the free magnetic layer 132 while the second bias layer 330 is formed with outward portions 350 that are fabricated above the laterally disposed AFM layer structures 320 and strongly pinned by it. As a result, the shield to shield distance of the embodiment 300 of the present depicted in FIG. 5 is reduced from that of the prior art sensor of FIG. 3, such that smaller data bits of a hard disk having an increased a real data storage density can be effectively read by the sensor of the present invention.

Another advantage of the magnetic head sensor of FIG. 5 is that the sense current does not pass through the biasing portion 350 of the bias layer 330, and this results in a lowering of the temperature where the biasing occurs. Specifically, it is known that the effective pinning of the magnetization of the biasing layer is temperature sensitive, and a temperature of approximately 250° C. can effectively reduce to near zero the magnetic pinning effect between the AFM layer 150 and the bias layer 144. In a CPP head such as is depicted in FIG. 3, it is not uncommon for the head to reach operating temperatures of approximately 180° C., which can substantially reduce the pinning effect between the bias layer 144 and the central AFM layer 150. However, in the present invention 300, the pinning of the biasing layer 330 occurs at laterally disposed locations 350 away from the central electrical current path, and the temperature at the outward biasing locations 350 can be as low as 60 to 80° C., such that the pinning effect is not substantially reduced by high temperature.

The magnetic head sensor depicted in FIG. 5 and described here above, can be fabricated as a tunnel barrier sensor by a modification of the spacer layer that is disposed between the pinned layer and the free magnetic layer. Specifically, as described here above, where the spacer layer 128 is replaced a tunnel barrier layer 274, comprised of an electrically insulating material such as alumina and having a thickness of approximately 3 Å to 8 Å a tunnel barrier sensor of the present invention is created. As will be understood by those skilled in the art. A tunnel barrier sensor embodiment of FIG. 5 will have a somewhat reduced shield to shield distance in that the tunnel barrier layer is thinner than the spacer layer of the GMR sensor device.

In fabricating the magnetic heads and read sensors, as described above, it is known in the prior art and depicted in FIGS. 3, 4 and 5 to pin the pinned layer 124 by using the layer of antiferromagnetic (AFM) material 120. However this structure can have disadvantages that result from the thickness of the AFM layer 120, which is typically large compared to the other layers. This thickness of AFM material 120 may be so great that it is as thick as the other layers of material combined, and the AFM layer thickness may become one of the limiting factors in the reduction of size of the thickness of the gap between the magnetic shields. Therefore, there are further advantages to magnetic heads where the pinned layer does not require a thick AFM material layer to pin it, i.e. if the pinned layer is "self-pinned".

Figure 6:
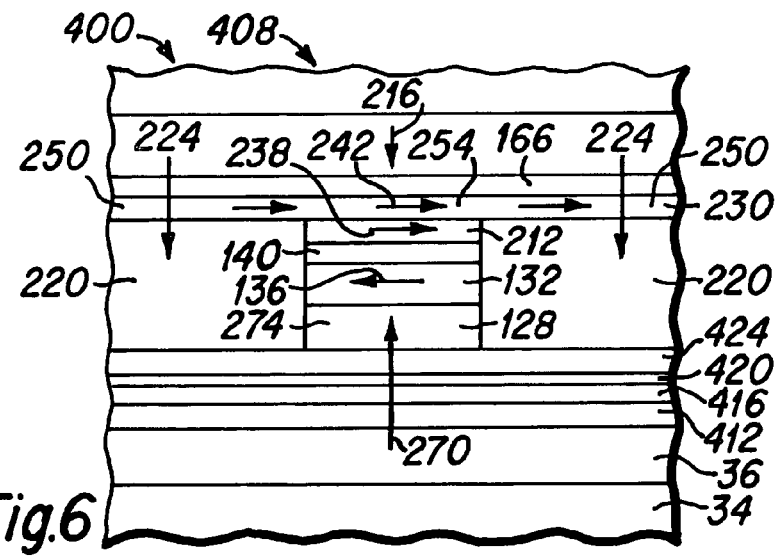
FIG. 6 is an ABS view depicting another embodiment of a sensor structure of the present invention.
Figure 7:
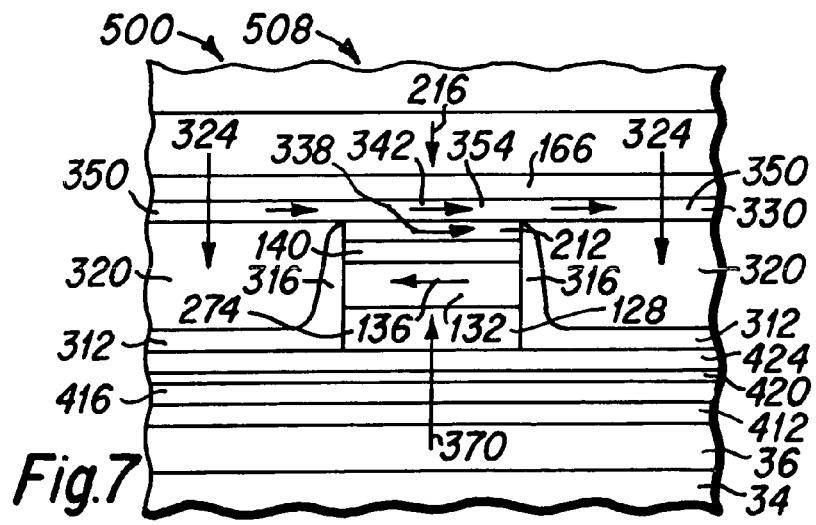
FIG. 7 is an ABS view depicting a further embodiment of a sensor structure of the present invention.

Magnetic heads of the present invention having a read sensor with a self-pinned magnetic layer are next described with the aid of FIGS. 6 and 7, where FIG. 6 is substantially similar to FIG. 4 and FIG. 7 is substantially similar to FIG. 5.

FIG. 6 is an ABS view depicting a sensor structure 400 of a magnetic head 408 of the present invention. The sensor 400 includes several structural features that are substantially identical to those depicted in FIG. 4 and described here above, and such structures are identically numbered for ease of comprehension. As depicted in FIG. 6, the sensor includes an SI magnetic shield 36 that is fabricated upon the insulation layer 34. A self-pinned pinning layer structure is next fabricated in which a relatively thin layer of antiferromagnetic material 412, such as PtMn having a thickness of approximately 30 Å is deposited upon the first magnetic shield 36. The AFM layer 120 typically requires an NiFeCr/NiFe seed layer that is initially deposited upon the magnetic shield 36 to obtain stronger pinning properties. Thereafter, a first layer of ferromagnetic material 416, preferably comprised of CoFe/NiFe, Fe, or most preferred CoFe, having a thickness of approximately 20 Å is deposited upon the AFM layer 412. Thereafter a non-magnetic metal spacer layer 420, preferably comprised of Cr, Ir, Cu, Rh, Re, and most preferably Ru, having a thickness of approximately 3 Å to 10 Å and preferably approximately 8 Å, is deposited upon the first ferromagnetic layer 416. A second layer of ferromagnetic material 424 that is substantially similar to the first layer 416 is then deposited upon the metal spacer layer 420. The magnetization of the ferromagnetic layers 416 and 424 is antiparallel coupled through the spacer layer 420, such that the overall magnetization of the pinned structure is self-pinned in the desired direction, such as into the plane of FIG. 6.

Thereafter, a magnetic sensor structure that is substantially similar to that depicted in FIG. 4 is fabricated. The sensor 400 thus includes a spacer layer 128, typically composed of an electrically conductive material such as copper and having a thickness of approximately 20-40 Å that is deposited upon the self-pinned magnetic layer 424. A free magnetic layer 132, comprised of a material such as CoFe or NiFe, or a multi-layer combination thereof, and having a thickness of from 20 Å to 40 Å, is then fabricated upon the spacer layer 128. The free magnetic layer 132 is formed with a magnetization that is in the ABS plane of the magnetic head (see arrow 136). Thereafter, a spacer layer 140, composed of an electrically conductive material such as Ta, Ru or Cu, and having a thickness of approximately 20 Å, is deposited upon the free magnetic layer.

A first magnetic biasing layer 212 is next fabricated upon the spacer layer 140. A spacer layer 140 comprised of Cu is preferred over other spacer layers because it provides superior magnetic properties, Hc, magnetostriction for the magnetic biasing layer 212. The biasing layer is preferably comprised of a material such as CoFe and is fabricated with a thickness that is approximately one-half of the thickness of the free layer 132; that is, approximately 10 Å to 25 Å. A temporary cap layer (not shown) typically comprised of tantalum and having a thickness of approximately 20 Å is deposited upon the biasing layer 212 to protect it in subsequent fabrication steps. A mask (not shown) is next fabricated upon the central portion 216 of the sensor layers, such that outer portions of the sensor layers are not covered by the mask. Thereafter, a material removal step is conducted, such as an ion milling or sputter etching step, in which the unmasked outer portions of the sensor layers are removed, down to the pinned magnetic layer 424, while the masked central region is protected. Thereafter, an electrically non-conducting, antiferromagnetic layer 220, comprised of a material such as NiO is deposited to fill the outer portions 224 of the sensor next to the masked central region. The thickness of the NiO AFM layer should be approximately equal to the thickness of the central region. Following the deposition of the NiO AFM layer, the mask is removed and the temporary cap layer (not shown) mentioned above is removed, preferably utilizing a reactive ion etch (RIE) process with fluorine active species, as is known to those skilled in the art.

A second bias layer 230 is next deposited across the sensor surface. The second bias layer 230 is preferably formed from a material such as CoFe and has a thickness that is approximately one-half of the thickness of the free magnetic layer 132; that is, approximately 10 Å to 25 Å. The magnetization of the first bias layer (see arrow 238) and of the second bias layer (see arrow 242) is directed in the plane of the ABS of the magnetic head and opposite to the direction of magnetization (see arrow 136) of the free magnetic layer. The total thickness of the first plus second bias layers is preferably equal to or somewhat greater than (approximately 1.2 to 1.5 times) the thickness of the free magnetic layer 132, and the magnetization of the free magnetic layer is magnetically exchange coupled to the magnetization of the bias layers. A cap layer 166 and the second magnetic shield 58 are subsequently fabricated upon the second bias layer, and the insulation layer 59 is thereafter deposited upon the second magnetic shield 58 to complete the fabrication of the read head portion of the magnetic head.

The laterally disposed AFM layer structures 220 provide a strong pinning effect on the magnetization of the second bias layer 230 that is deposited above the AFM layer structures, and the strong pinning of the outer portions 250 of the second bias layer serve to pin the central portion 254 of the second bias layer. The pinned second bias layer then strongly pins the magnetization of the first bias layer 212. As a result, an effective biasing of the magnetization of the free magnetic layer is achieved.

In comparing the sensor embodiment 400 of the present invention depicted in FIG. 6, with the prior art sensor depicted in FIG. 3, a first significant difference is that the shield to shield distance has been reduced in the magnetic head embodiment depicted in FIG. 6 by the removal of the second AFM layer 150 from the central stack structure between the magnetic shields, and by the reduction in the thickness of the first AFM layer 120 through the use of a self-pinned magnetic layer structure 412-424. As a result, the shield to shield distance of the magnetic head embodiment 400 of the present depicted in FIG. 6 is reduced from that of the prior art sensor of FIG. 3, such that smaller data bits of a hard disk having an increased a real data storage density can be effectively read by the magnetic head sensor of the present invention.

Another advantage of the magnetic head sensor of FIG. 6, as with the magnetic head of FIG. 4, is that the sense current 270 does not pass through the biasing portion 250 of the bias layer 230, and this results in a lowering of the temperature where the magnetic biasing occurs. As a result the pinning effect for the bias layer 230 is not substantially reduced by the high temperature in the electrically conducting central stack.

The magnetic head sensor depicted in FIG. 6 and described here above, can be fabricated as a tunnel barrier sensor by a modification of the spacer layer that is disposed between the pinned layer and the free magnetic layer. Specifically, as described here above, where the spacer layer 128 is replaced a tunnel barrier layer 274, comprised of an electrically insulating material such as alumina and having a thickness of approximately 3 Å to 8 Å a tunnel barrier sensor of the present invention is created. As will be understood by those skilled in the art. A tunnel barrier sensor embodiment of FIG. 6 will have a somewhat reduced shield to shield distance in that the tunnel barrier layer is thinner than the spacer layer of the GMR sensor device.

A further magnetic head embodiment 508 of the present invention is next described with the aid of FIG. 7, which is an ABS view depicting a sensor structure 500 of the present invention. As will be understood from the following description, the significant difference between the magnetic head of FIG. 7 and that of FIG. 5 is the use of a self-pinned pinning layer structure. Therefore, the sensor 500 includes many structural features that are substantially identical to those depicted in FIG. 5 and described here above, and such structures are identically numbered for ease of comprehension. As depicted in FIG. 7, the sensor 500 includes an SI magnetic shield 36 that is fabricated upon the insulation layer 34. A self-pinned pinning layer structure is next fabricated in which a relatively thin layer of antiferromagnetic material 412, such as PtMn having a thickness of approximately 30 Å is deposited upon the first magnetic shield 36. The AFM layer 120 typically requires an NiFeCr/NiFe seed layer that is initially deposited upon the magnetic shield 36 to obtain stronger pinning properties. Thereafter, a first layer of ferromagnetic material 416, preferably comprised of CoFe/NiFe, Fe, or most preferred CoFe, having a thickness of approximately 20 Å is deposited upon the AFM layer 412. Thereafter a non-magnetic metal spacer layer 420, preferably comprised of Cr, Ir, Cu, Rh, Re, and most preferably Ru, having a thickness of approximately 3 Å to 10 Å and preferably approximately 8 Å, is deposited upon the first ferromagnetic layer 416. A second layer 424 of ferromagnetic material that is substantially similar to the first layer 416 is then deposited upon the spacer layer 420. The magnetization of the ferromagnetic layers 416 and 424 is antiparallel coupled through the spacer layer 420, such that the overall magnetization of the structure is self-pinned in the desired direction, such as into the plane of FIG. 6.

Thereafter, a spacer layer 128, typically composed of an electrically conductive material such as copper and having a thickness of approximately 20-40 Å is deposited upon the pinned magnetic layer 424. A free magnetic layer 132, comprised of a material such as CoFe or NiFe, or a multi-layer combination thereof, and having a thickness of from 20 Å to 40 Å, is then fabricated upon the spacer layer 128. The free magnetic layer 132 is formed with a magnetization that is in the ABS plane of the magnetic head (see arrow 136). Thereafter, a spacer layer 140, composed of an electrically conductive material such as Ta, Ru or Cu, and having a thickness of approximately 20 Å, is deposited upon the free magnetic layer 132. A first magnetic biasing layer 212 is next fabricated upon the spacer layer 140. A spacer layer 140 comprised of Cu is preferred over other spacer layers because it provides superior magnetic properties, Hc, magnetostriction for the magnetic biasing layer 212. The biasing layer 212 is preferably comprised of a material such as CoFe and is fabricated with a thickness that is approximately one-half of the thickness of the free layer 132; that is, approximately 10 Å to 25 Å. A temporary cap layer (not shown) typically comprised of tantalum and having a thickness of approximately 20 Å is deposited upon the biasing layer 212 to protect it in subsequent fabrication steps.

A mask (not shown) is next fabricated upon the central portion 216 of the sensor layers, such that outer portions of the sensor layers are not covered by the mask. Thereafter, a material removal step is conducted, such as an ion milling or sputter etching step, in which the unmasked outer portions of the sensor layers are removed, down to the pinned magnetic layer 424, while the masked central region 216 is protected. An electrically insulative layer 312 is next deposited across the device. The electrically insulative layer 312 is preferably comprised of a material such as alumina and it is deposited to a thickness of at least approximately 20 Å to provide adequate electrical insulation. It is desirable that the alumina insulation be deposited upon the side surfaces 316 of the central sensor stack 216 to prevent electrical current leakage from the central stack. Thereafter, an electrically conductive, antiferromagnetic layer 320, comprised of a material such as IrMn or PtMn is deposited to fill the outer portions 324 of the sensor next to the masked central region 216 and on top of the insulating layer 312. The thickness of the insulating layer 312 plus the AFM layer 320 should be approximately equal to the thickness of the central region 216. Following the deposition of the AFM layer 320, the mask is removed and the temporary cap layer (not shown) mentioned above is removed, preferably utilizing a reactive ion etch (RIE) process with fluorine active species, as is known to those skilled in the art.

A second bias layer 330 is next deposited across the sensor surface. The second bias layer 330 is preferably formed from a material such as CoFe and has a thickness that is approximately one-half of the thickness of the free magnetic layer 132; that is, approximately 10 Å to 25 Å. Where the AFM material 320 is IrMn it is particularly desirable for good pinning of the bias layer that the second bias layer 330 be comprised of $CoFe_{30}$. The magnetization of the first bias layer (see arrow 338) and of the second bias layer (see arrow 342) is directed in the plane of the ABS and opposite to the direction of magnetization (see arrow 136) of the free magnetic layer 132. The total thickness of the first 212 plus second 330 bias layers is preferably equal to or somewhat greater than (approximately 1.2 to 1.5 times) the thickness of the free magnetic layer 132, and the magnetization of the free magnetic layer is magnetically exchange coupled to the magnetization of the bias layers. A cap layer 166 and the second magnetic shield 58 are subsequently fabricated upon the second bias layer, and the insulation layer 59 is thereafter deposited upon the second magnetic shield 58 to complete the fabrication of the read head portion of the magnetic head.

The laterally disposed AFM layer structures 320 provide a strong pinning effect on the magnetization of the second bias layer 330 that is deposited above the AFM layer structure 320, and the strong pinning of the outer portions 350 of the second bias layer 330 serve to pin the central portions 354 of the second bias layer. The pinned second bias layer 330 then strongly pins the magnetization of the first bias layer 212. As a result, an effective biasing of the magnetization of the free magnetic layer is achieved.

In comparing the sensor embodiment of the present invention depicted in FIG. 7, with the prior art sensor depicted in FIG. 3, a first significant difference is that the shield to shield distance has been reduced in the embodiment depicted in FIG. 7 by the removal of the second AFM layer 150 from the central stack structure between the magnetic shields and by the reduction in the thickness of the first AFM layer 120 through the use of a self-pinned magnetic layer structure 412-424. As a result, the shield to shield distance of the embodiment 500 of the present depicted in FIG. 7 is reduced from that of the prior art sensor of FIG. 3, such that smaller data bits of a hard disk having an increased a real data storage density can be effectively read by the sensor of the present invention.

Another advantage of the magnetic head sensor of FIG. 7 as with the magnetic head of FIG. 5 is that the sense current 370 does not pass through the biasing portion 350 of the bias layer 330, and this results in a lowering of the temperature where the biasing occurs. As a result the pinning effect for the bias layers 330 and 212 is not substantially reduced by high temperatures.

The magnetic head sensor depicted in FIG. 7 and described here above, can be fabricated as a tunnel barrier sensor by a modification of the spacer layer that is disposed between the pinned layer structure and the free magnetic layer. Specifically, as described here above, where the spacer layer 128 is replaced a tunnel barrier layer 274, comprised of an electrically insulating material such as alumina and having a thickness of approximately 3 Å to 8 Å a tunnel barrier sensor of the present invention is created. As will be understood by those skilled in the art. A tunnel barrier sensor embodiment of FIG. 7 will have a somewhat reduced shield to shield distance in that the tunnel barrier layer 274 is thinner than the spacer layer 128 of the GMR sensor device.

While the present invention has been shown and described with regard to certain preferred embodiments, it is to be understood that modifications in form and detail will no doubt be developed by those skilled in the art upon reviewing this disclosure. It is therefore intended that the following claims cover all such alterations and modifications that nevertheless include the true spirit and scope of the inventive features of the present invention.

I claim:

1. A magnetic head including a CPP read sensor, comprising:
 a free magnetic layer;
 a spacer layer;
 a biasing layer for said free magnetic layer;
 an antiferromagnetic (AFM) material layer for pinning the magnetization of said biasing layer;
 where said free magnetic layer is disposed in a central sensor layer stack, and said AFM material layer is laterally disposed relative to said central sensor layer stack, and wherein said biasing layer includes a centrally disposed first layer that is disposed within said central layer stack and directly upon said spacer layer, and a second layer including a centrally disposed portion that is disposed directly upon said first layer and outwardly disposed portions that are disposed directly upon said AFM material layer; and wherein said biasing layer is exchange coupled with said free magnetic layer.

2. A magnetic head as described in claim 1 wherein said AFM material layer is comprised of an electrically non-conductive material, and wherein said biasing layer is formed with a thickness that is less than 1.5 times a thickness of said free magnetic layer.

3. A magnetic head as described in claim 2 wherein said electrically non-conductive material is NiO.

4. A magnetic head as described in claim 2 wherein said free magnetic layer is formed with a thickness of approximately 10 Å to 20 Å, and said spacer layer is formed with a thickness of approximately 20 Å, and said first layer has a thickness that is approximately equal to a thickness of said second layer.

5. A magnetic head as described in claim 1 wherein said AFM material layer is comprised of an insulating material layer and a layer of an electrically conductive antiferromagnetic material.

6. A magnetic head as described in claim 5 wherein said insulating material layer is comprised of alumina.

7. A magnetic head as described in claim 5 wherein said electrically conductive antiferromagnetic material is comprised of PtMn or IrMn.

8. A magnetic head as described in claim 4 wherein said electrically conductive antiferromagnetic material is comprised of IrMn and said biasing layer is comprised of $CoFe_{30}$.

9. A magnetic head as described in claim 1 wherein said central sensor layer stack further includes a tunnel barrier layer.

10. A magnetic head as described in claim 1 wherein said sensor includes a pinned magnetic layer that is self-pinned.

11. A magnetic head as described in claim 1, wherein said sensor includes a pinned magnetic layer that includes a first ferromagnetic layer, a spacer layer and a second ferromagnetic layer, where the magnetization of said first ferromagnetic layer and said second ferromagnetic layer is antiparallel coupled.

12. A hard disk drive including a magnetic head including a CPP read sensor, comprising:
    a free magnetic layer;
    a spacer layer;
    a biasing layer for said free magnetic layer;
    an antiferromagnetic (AFM) material layer for pinning the magnetization of said biasing layer;
    where said free magnetic layer is disposed in a central sensor layer stack, and said AFM material layer is laterally disposed relative to said central sensor layer stack, and wherein said biasing layer includes a centrally disposed first layer that is disposed within said central layer stack and directly upon said spacer layer, and a second layer including a centrally disposed portion that is disposed directly upon said first layer and outwardly disposed portions that are disposed directly upon said AFM material layer; and
    wherein said biasing layer is exchange coupled with said free magnetic layer.

13. A hard disk drive as described in claim 12 wherein said AFM material layer is comprised of an electrically non-conductive material, and wherein said biasing layer is formed with a thickness that is less than 1.5 times a thickness of said free magnetic layer.

14. A hard disk drive as described in claim 13 wherein said electrically non-conductive material is NiO.

15. A hard disk drive as described in claim 13 wherein said free magnetic layer is formed with a thickness of approximately 10 Å to 20 Å, and said spacer layer is formed with a thickness of approximately 20 Å, and said first layer has a thickness that is approximately equal to a thickness of said second layer.

16. A hard disk drive as described in claim 13 wherein said AFM material layer is comprised of an insulating material layer and a layer of an electrically conductive antiferromagnetic material.

17. A hard disk drive as described in claim 16 wherein said insulating material layer is comprised of alumina.

18. A hard disk drive as described in claim 16 wherein said electrically conductive antiferromagnetic material layer is comprised of PtMn or IrMn.

19. A hard disk drive as described in claim 16 wherein said electrically conductive antiferromagnetic material layer is comprised of IrMn and said biasing layer is comprised of $CoFe_{30}$.

20. A hard disk drive as described in claim 12 wherein said central sensor layer stack further includes a tunnel barrier layer.

21. A hard disk drive as described in claim 12 wherein said sensor includes a pinned magnetic layer that is self-pinned.

22. A hard disk drive as described in claim 12, wherein said sensor includes a pinned magnetic layer that includes a first ferromagnetic layer, a spacer layer and a second ferromagnetic layer, where the magnetization of said first ferromagnetic layer and said second ferromagnetic layer is antiparallel coupled.

\* \* \* \* \*